US005273795A

United States Patent [19]

Ullrich

[11] Patent Number: 5,273,795

[45] Date of Patent: Dec. 28, 1993

[54] IMITATION GEM

[75] Inventor: Klaus Ullrich, Gaggenau-Bad Rotenfels, Fed. Rep. of Germany

[73] Assignee: Reinhold Hoffmann, Ettlingen, Fed. Rep. of Germany

[21] Appl. No.: 34,107

[22] Filed: Mar. 22, 1993

[30] Foreign Application Priority Data

Aug. 1, 1992 [DE] Fed. Rep. of Germany ....... 4225543

[51] Int. Cl.[5] ........................ B32B 27/06; B32B 27/30

[52] U.S. Cl. ........................................ 428/15; 428/40; 428/349; 428/354; 264/328.17; 264/331.18

[58] Field of Search ................. 428/15, 343, 354, 349, 428/40; 264/328.1, 328.17, 331.18

[56] References Cited

U.S. PATENT DOCUMENTS 2,270,270 1/1942 Clare .................................... 428/15
2,350,421 6/1944 Schoder ................................ 428/15
3,813,310 5/1974 Droege ................................ 428/15
4,030,317 6/1977 Rogell .................................. 428/15
4,295,347 10/1981 Visconti .............................. 428/15
4,353,765 10/1982 Covi .................................... 428/15
4,356,617 11/1982 Coscia ................................ 428/40
4,581,088 4/1986 House .................................. 428/15
4,604,876 8/1986 Hoffmann ............................ 428/15
4,935,268 6/1990 Poll ...................................... 428/15

*Primary Examiner*—Jenna L. Davis
*Attorney, Agent, or Firm*—Klaus J. Bach

[57] ABSTRACT

In an imitation gem consisting of acrylic glass with an underside and a jewel-like display side the underside is provided with a lacquer coating which is of a predetermined thickness and able to resist temperatures of at least 100° C., a metal layer is disposed on the lacquer layer and a heat fusible adhesive material is disposed on the metal layer to permit fastening the gem to a material by the application of heat without damaging the acrylic glass gem.

6 Claims, 1 Drawing Sheet

IMITATION GEM

BACKGROUND OF THE INVENTION

The invention relates to an imitation gem consisting of acrylic glass (PMMA), so-called plexistrass, which has an at least partially level underside and a display side formed like a jewel.

Imitation gems are used in large numbers in the clothing industry. Those imitation gems which were originally made from glass have been displaced by imitation gems consisting of resin, particularly of acrylic glass. This has happened not only for economic reasons as resin imitations can be manufactured at substantially lower costs, but also because of the high weight of the glass imitations. This is true for imitations which, pressed into frames, have been used, for example, as buttons, as well as for imitations which were directly applied to a material by stitching. Particularly in the last-named example however the weight of the glass imitations has been found to be quite objectionable since the material is distorted by the weight and produces undesired wrinkles.

For direct application of the imitation gems to the material, application by ironing has been found to be suitable. For such applications the imitation gems which, in this case, need to be of glass because of the heat generated during ironing, are provided with a layer of a heat adhesive or, respectively, a fusion adhesive which, under the influence of the heat generated during ironing, is inseparably connected to the material. As mentioned before such economic application by ironing is possible only in connection with imitation gems consisting of glass since the heat applied in the process would destroy at least the brilliance of imitation gems of plastic. But then the weight of glass imitation gems and the resulting disadvantages have to be accepted.

It is the object of the present invention to provide for plastic imitation gems which can also be connected to a material economically, that is, by means of a heat fusible adhesive.

SUMMARY OF THE INVENTION

An imitation gem consisting of acrylic glass with an underside and a jewel-like display side wherein the underside is provided with a lacquer coating of a thickness of at least $10\times10^{-6}$ m and a temperature resistance of at least 100° C., a metal layer of at least $10^{-6}$ m thickness disposed on the lacquer layer and a heat fusible adhesive disposed on the metal layer to permit fusing the imitation gem to an underlying material by application of heat thereto.

It is unique to apply to the plane underside of such an imitation gem a thermally highly resistant lacquer layer of a thickness which is so selected that, during the ironing process, the heat transfer of the melting adhesive layer to the acrylic glass is inhibited or almost prevented for at least a short period of time. The process can be enhanced by appropriate selection of the fushion adhesive which should melt at a temperature of about 100° C. It has in fact been shown that imitation gems of acrylic glass can be ironed onto a material without losing any brillance if they are coated in accordance with the present invention. "Ironing" the gems onto material is to be understood to include attachment by any other way of heat application such as heat irradiation or exposure to high-frequency electromagnetic fields (microwave).

In accordance with the invention polyurethane reaction resin is preferably used as the lacquer and a copolyamide is used as the heat fusible adhesive. The heat fusible adhesive may also be present as a thermoplastic adhesive foil. The heat fusible adhesive however may also consist of a heat fusible foil which is disposed on the metal coating. For the application of such a heat fusible foil it is advisable in accordance with the invention that it is placed onto the metal layer which is then heated to 80% of the melting point of the heat fusible foil. The final combination of the heat fusible adhesive with the imitation gem and the material occurs then by application of heat, that is, by "ironing" the gem onto the material.

If attachment of this thermoplastic heat fusible adhesive layer is affected by direct heat transfer, for example, by means of a cloth ironing press, it is desirable to place a non-adhesive foil which may comprise a silicone paper or a polyethylene separation film between the thermoplastic heat fusible adhesive foil and the press. Covering of the heat fusible adhesive material is also advisable if the imitation gems according to the invention are applied as single pieces in order to avoid undesired adhesion under the influence of heat such as solar radiation.

DESCRIPTION OF THE PREFERRED EMBODIMENT

Figure 1:
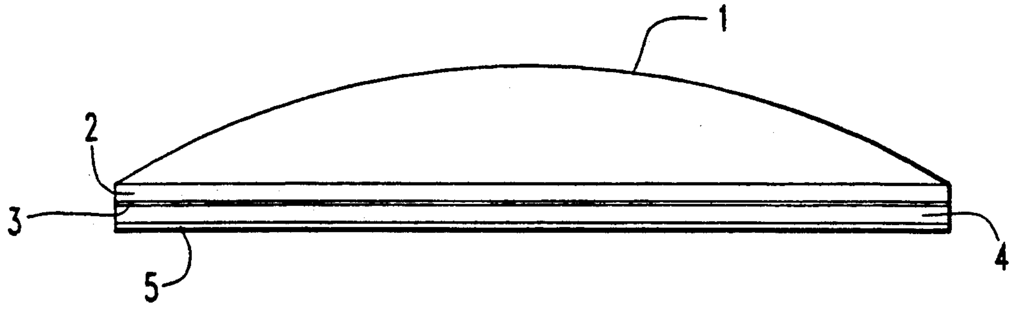
FIG. 1 shows schematically an imitation gem according to the invention.

As shown in FIG. 1 the plane underside of an imitation gem 1 consisting of acrylic glass is provided with a thermally highly resistant lacquer coating 2. A thin metal layer 3 is applied to the lacquer coating 2, for example, by vapor deposition. A heat fusible adhesive layer 4 is disposed on the metal layer 3, the heat fusible adhesive layer being finally covered by a non-adhesive foil 5.

For ironing such an imitation gem onto a material, the non-adhesive foil 5 is removed and the imitation gem is placed onto the material whereupon the adhesive layer is caused to melt by application of heat such that the adhesive is firmly fused with the imitation gem as well as with the material.

Figure 2:
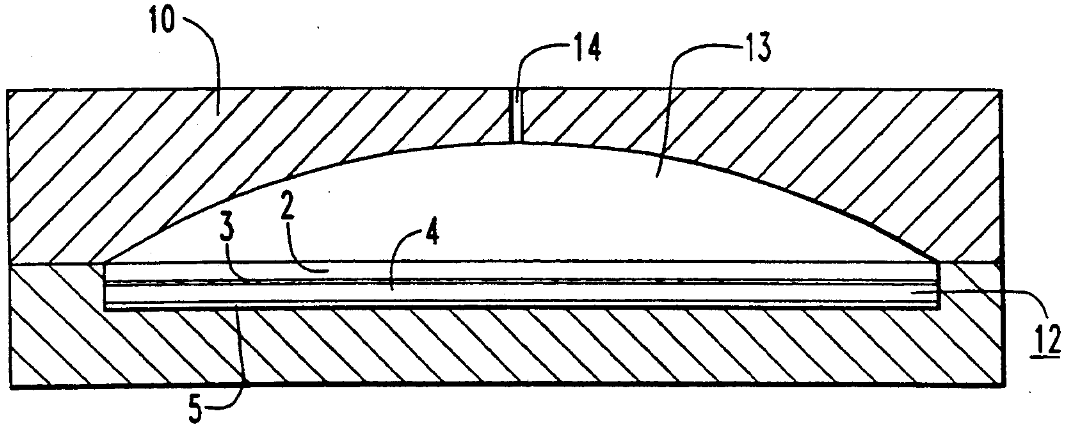
FIG. 2 illustrates the imitation gem molding process.

As illustrated in FIG. 2 the imitation gem is preferably molded in a two-part injection mold 10, 11 onto a foil member 12 which consists of a metal foil 3 having the lacquer layer 2 disposed on its side adjacent the gem-forcing cavity 13 and a hot fusion adhesive layer 4 at its opposite side adjacent the mold bottom 11. When hot acrylic glass material is injected into the mold cavity 13 through passage 14 it fills the cavity 13 and fuses at the flat bottom side with the lacquer layer 2 thereby becoming integral with the foil member 12. Upon opening the injection mold 10, 11, the imitation gem can be removed with the foil member disposed on its underside.

What is claimed is:

1. An imitation gem consisting of polymethyl methacrylate (PMMA) which has an at least partially plane underside and a display side, said gem having on its plane underside a lacquer coating which has at least a short term thermal resistance up to at least 100° C. and a thickness of at least $10 \times 10^{-6}$ m, a metal layer of at least $10^{-6}$ m thickness disposed on said lacquer layer and a layer of a heat fusible adhesive material disposed on said metal layer.

2. An imitation gem according to claim 1, wherein said lacquer consists of a polyurethane reaction resin.

3. An imitation gem according to claim 1, wherein said heat fusible adhesive material is a copolyamide.

4. An imitation gem according to claim 1, wherein said metal layer is an aluminum layer.

5. An imitation gem according to claim 1, wherein said heat fusible adhesive material layer is covered by a non-adhesive foil.

6. A method of manufacturing an imitation gem polymethyl methacrylate which is molded in an injection molding tool, wherein a heat fusible adhesive foil with a metal layer of a thickness of at least $10^{-6}$ m and a lacquer layer which has a short term thermal resistance up to at least 100° C. and a thickness of at least $10 \times 10^{-6}$ m disposed thereon is placed in the molding tool so that, upon injection molding of the polymethyl methacrylate gem, the underside of the gem is fused with the lacquer layer.

* * * * *